(12) United States Patent
Lay

(10) Patent No.: US 11,672,737 B1
(45) Date of Patent: Jun. 13, 2023

(54) MEDICINE CUP APPARATUS WITH RING ATTACHMENT

(71) Applicant: ALLI L.L.C., Saint Bernard, LA (US)

(72) Inventor: Adrienne Landry Lay, St. Bernard, LA (US)

(73) Assignee: ALLI L.L.C., Saint Bernard, LA (US)

( * ) Notice: Subject to any disclaimer, the term of this patent is extended or adjusted under 35 U.S.C. 154(b) by 0 days.

(21) Appl. No.: 17/568,932

(22) Filed: Jan. 5, 2022

Related U.S. Application Data

(63) Continuation of application No. 17/073,659, filed on Oct. 19, 2020, now Pat. No. 11,246,804.

(60) Provisional application No. 62/916,604, filed on Oct. 17, 2019.

(51) Int. Cl.
*G01F 19/00* (2006.01)
*A61J 7/00* (2006.01)

(52) U.S. Cl.
CPC ............ *A61J 7/0046* (2013.01); *G01F 19/00* (2013.01); *A61J 2200/76* (2013.01)

(58) Field of Classification Search
CPC ................................. A61J 7/0046; G01F 19/00
See application file for complete search history.

(56) References Cited

U.S. PATENT DOCUMENTS

| | | | | |
|---|---|---|---|---|
| 4,844,308 A * | 7/1989 | Porteous | ............... | A61C 19/006 224/217 |
| 5,112,227 A * | 5/1992 | Bull | ....................... | A61B 50/20 433/163 |
| 5,169,315 A * | 12/1992 | Bull | ..................... | A61C 19/006 433/163 |
| 5,368,482 A * | 11/1994 | Johnsen | .................. | A61C 19/00 433/163 |
| 5,662,249 A * | 9/1997 | Grosse | .................... | B65D 51/24 141/381 |
| 5,732,862 A * | 3/1998 | Bull | ..................... | A61C 19/006 433/163 |
| 6,082,997 A * | 7/2000 | Prescott | ............... | A61C 19/006 433/163 |
| 2006/0124579 A1* | 6/2006 | Nielson | ................. | B65D 23/104 215/396 |
| 2010/0211004 A1* | 8/2010 | Williams | ............... | A61J 7/0046 604/78 |

* cited by examiner

*Primary Examiner* — Jamel E Williams
(74) *Attorney, Agent, or Firm* — Garvey, Smith & Nehrbass, Patent Attorneys, L.L.C.; Charles C. Garvey, Jr.; Julie Rabalais Chauvin

(57) ABSTRACT

A medicine cup apparatus that includes a cup having a side wall, bottom panel, open top, and an interior for holding a selected medicine. A ring is affixed to the cup that can fit around a user's finger, allowing the user to more easily hold the medicine cup and administer medicine orally. The ring is affixed to the cup bottom panel permanently or removably.

20 Claims, 6 Drawing Sheets

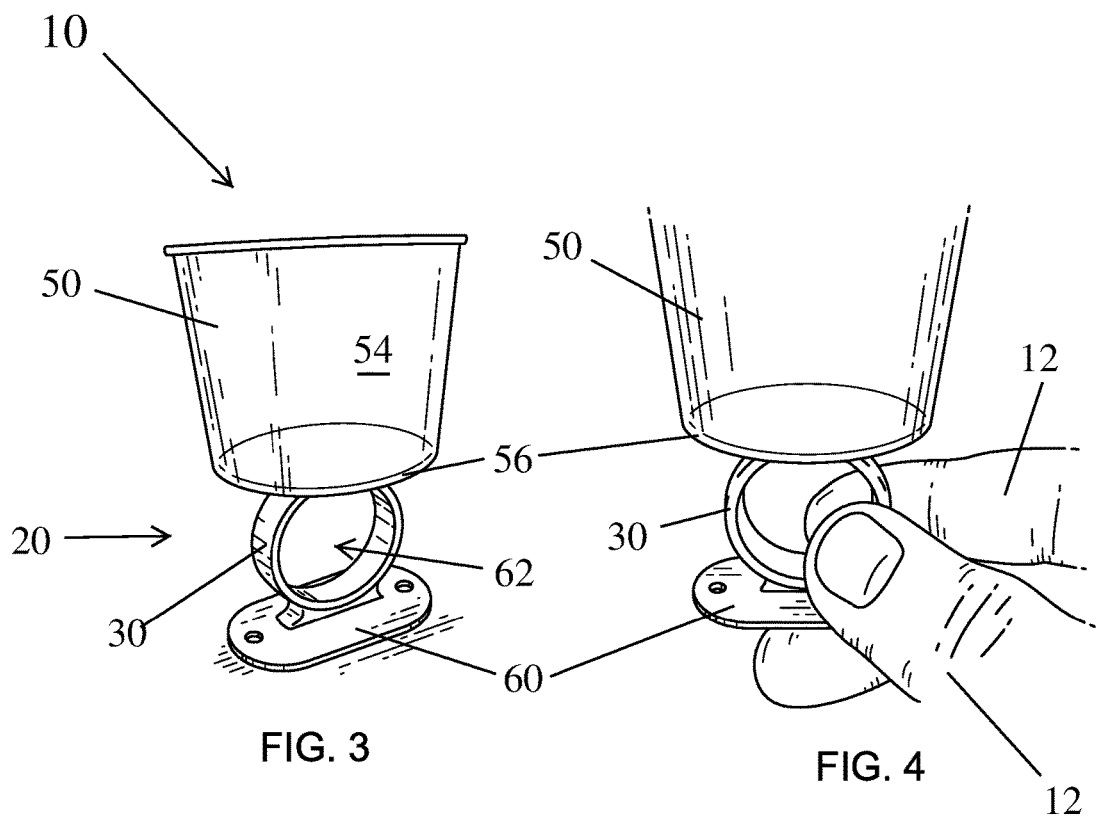
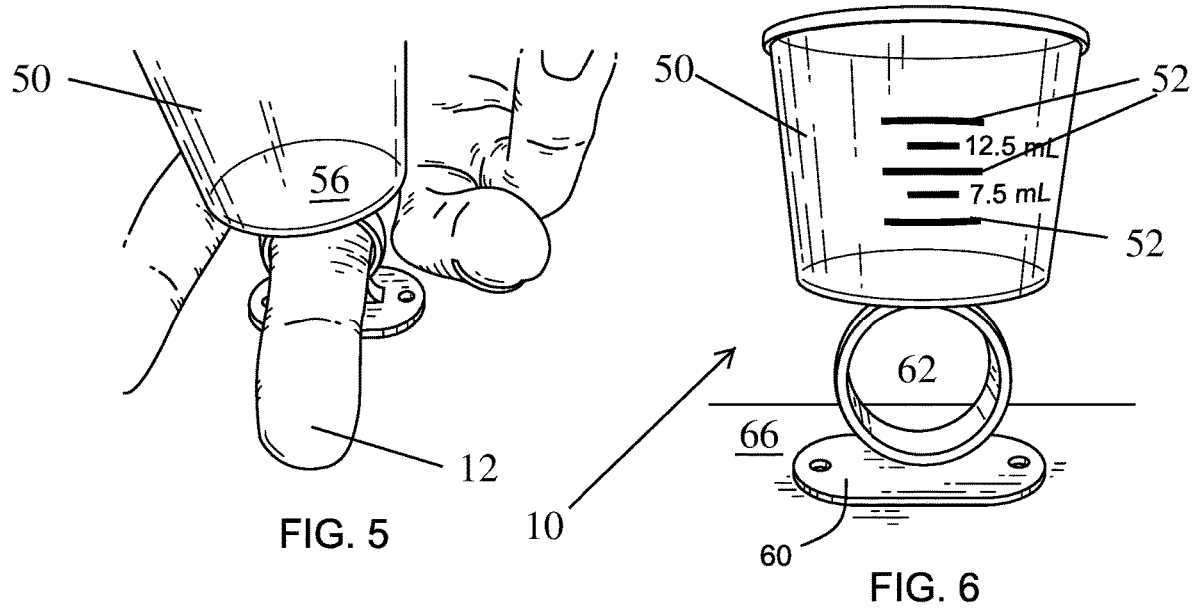

MEDICINE CUP APPARATUS WITH RING ATTACHMENT

CROSS-REFERENCE TO RELATED APPLICATIONS

This application is a continuation of my U.S. patent application Ser. No. 17/073,659, filed 19 Oct. 2020 (issued as U.S. Pat. No. 11,246,804 on 15 Feb. 2022), which claims the benefit of my U.S. Provisional Patent Application No. 62/916,604, filed 17 Oct. 2019, both of which are hereby incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to an improved medicine cup design. More particularly, the present invention relates to an improved medicine cup design that includes a ring attachment to the cup that can fit around a user's finger, allowing the user to more easily hold the medicine cup and administer medicine orally.

2. General Background of the Invention

Medicine cups that are currently available can be difficult for some people to grip or hold, making it difficult for them to orally take medicine. The present invention relates to an improved medicine cup design that includes a ring attachment to the cup that can fit around a user's finger, allowing the user to more easily hold the medicine cup and administer medicine orally.

The following possibly relevant U.S. Patents and U.S. Patent Application Publications are incorporated herein by reference: U.S. Pat. Nos. 2,222,741; 4,717,057; 4,844,308; 5,135,226; 5,169,315; 5,732,862; 7,228,982; 10,364,074; 2008/0311543; 2009/0137966; 2011/0266313; 2015/0027920; 2015/0094650; 2017/0282037

BRIEF SUMMARY OF THE INVENTION

The present invention relates to an improved medicine cup design. More particularly, the present invention relates to an improved medicine cup design that includes a cup side wall, cup bottom and a ring attachment to the cup bottom that can fit around a user's finger, thus allowing the user to more easily hold the medicine cup and administer medicine orally. The present invention can also include a base attached to the cup bottom allowing for the cup to stand upright. The present invention has infection control benefits, allowing users and those who administer medicine to users to limit touching to the ring attachment rather than the medicine cup itself. The present invention can also be used to hold food.

In a preferred embodiment of the present invention, the ring attachment attaches to the base of a medicine cup. The cup has gradations on its side to allow a user to measure the dose of medicine to be taken. The ring easily fits around a user's finger for ease of holding the cup, and administering medications. In an alternative embodiment, the ring attachment attaches to a side of the medicine cup. In various alternative preferred embodiments of the present invention, more than one ring attachment attaches to the medicine cup to allow for the user to use more than one finger to hold the cup.

In various preferred embodiments of the present invention, the ring attachment can be removably attached to the medicine cup, preferably removably attached to the bottom panel or surface of the medicine cup. Alternatively, the ring attachment can be an integrated, molded unit with the medicine cup.

In various preferred embodiments of the present invention, the ring and/or base that the ring attaches to, may be removable from the medicine cup. The apparatus can be constructed of plastics, metals, wood, ceramics, synthetic fibers, and polymers. The following can be means by which the ring and/or ring attachment attaches to the cup: suction cup, adhesive, magnetic, clasp, threading, snap, latch, and push button hole.

In various preferred embodiments of the present invention, the design can aid those with disabilities who may have trouble with the fine motor skills of holding a medicine cup. The ring attachment can allow for an older person or young child or someone with disabilities to more easily control and hold a medicine cup and administer medicine.

In various preferred embodiments of the present invention, the size of the ring attachment can vary to fit various sizes of medicine cups.

In various preferred embodiments of the present invention, the ring attachment and base can vary in color, shape, and size.

In various preferred embodiments of the present invention, the ring attachment can be textured to further assist a user in gripping the ring attachment.

In various preferred embodiments, the present invention can also include a stand that holds the medicine cup with the ring attachment attached to it. In various alternative embodiments, the present invention can also include a stand that holds multiple medicine cups, each with a ring attachment attached to it.

In various preferred embodiments of the present invention, the stand can stand upright and can vary in size, shape, and color and/or can be weighted. In various preferred embodiments of the present invention, the stand is designed to allow for the ring attachment to stand upright on its own with or without the medicine cup attached to it.

In various preferred embodiments of the present invention, the stand can be made out of rubber.

In various preferred embodiments of the present invention, the ring attachment can be made from latex or can be latex-free.

In various preferred embodiments of the present invention, the ring attachment can be designed to be compressed and/or stacked and/or collapsible for ease of storage. In various preferred embodiments, ring attachment can push up and/or down inside of cup if made of thin and malleable plastic. In various preferred embodiments, ring/cup can detach and each can stack similarly to how cups are stacked for packaging so that each component may be stored/stacked separately and then assembled. In various alternative embodiments, ring/cup can be manufactured as assembled.

In various preferred embodiments of the present invention, the ring attachment can be biodegradable.

In various preferred embodiments of the present invention, the ring attachment can have a non-skid base and/or stand.

In various preferred embodiments of the present invention, the ring attachment can have space on the base and/or on the ring and/or on the stand to allow it to be easily labeled. In various preferred embodiments of the present invention, the ring attachment, including the ring and base, can be labeled in any language. In various preferred embodiments of the present invention, the stand can be labeled in any language.

In various preferred embodiments of the present invention, the ring attachment and/or base and/or stand can light up. In various preferred embodiments of the present invention, the ring attachment and/or base and/or stand can glow in the dark.

In various preferred embodiments of the present invention, the ring attachment can have an elastic band that can stretch to allow for securing on a user's finger or wrist.

In various preferred embodiments of the present invention, the ring attachment can be digital and/or can talk to a user (like a smart phone or smart device).

In various preferred embodiments of the present invention, the ring attachment can include tactile dots.

In various preferred embodiments of the present invention, the ring attachment can also include a cover or lid that covers the medicine cup, as seen, for example, in FIG. 8. In various preferred embodiments, the cover can include various different closing/locking mechanisms typically found for various covers and/or lids. In various preferred embodiments of the present invention, cover and locking mechanisms of the lid/cover to the cup can include a snap connection, a threaded connection (preferably, internal threads on the lid and external threads on the cup), a hinged connection, plastics grip materials, a magnetic connection, and a suction connection.

In various preferred embodiments of the present invention, the medicine cup attachment can include and/or is made out of material(s) that prevent or control infection.

In various preferred embodiments of the present invention, the medicine cup attachment is stackable.

In various preferred embodiments of the present invention, the medicine cup ring attachment can be used one-handed.

In various preferred embodiments of the present invention, the ring attachment can vibrate.

In various preferred embodiments of the present invention, the ring attachment can include a battery. In various preferred embodiments of the present invention, the ring attachment can be charged.

In various preferred embodiments, the present invention can be medical or hospital grade and/or can be for home use grade, including being dishwasher safe.

In various preferred embodiments of the present invention, the ring attachment can be disposable.

In various preferred embodiments of the present invention, the ring attachment can include lettering and/or numbering on the exterior, including all different types of fonts, typefaces, and/or graphics. In various preferred embodiments of the present invention, the ring attachment, including the ring and/or base, and/or the stand can be labeled in any language.

In various preferred embodiments of the present invention, the ring attachment design has infection control benefits, allowing users and those who administer medicine to users to limit touching to the ring attachment rather than the medicine cup itself. For example, if a nurse is administering medications to a patient, the nurse would hold the ring attachment, such as holding the ring itself, instead of the medicine cup so that the nurse doesn't touch the cup that is brought to the patient's/user's mouth.

In various alternative embodiments of the present invention, the medicine cup apparatus with ring attachment may include smart technology, such as the ability to link or sync to an app on a mobile device In various alternative embodiments of the present invention, the ring can be oblong shaped and/or not completely closed.

In various alternative embodiments of the present invention, ring attachment of the present invention can be sized and shaped to accommodate body parts of a user other than a finger (such as a wrist or forearm for an amputee).

In various preferred embodiments of the present invention, the ring attachment can be used by a child (perhaps a toddler) to more easily hold a cup full of food, as seen, for example in FIG. 9. In various preferred embodiments of the present invention, the ring attachment can also be used to administer medicine to a child, as seen, for example, in FIG. 7.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIGS. 3-6 show other alternative embodiments of the apparatus of the present invention;

DETAILED DESCRIPTION OF THE INVENTION

Figure 1:
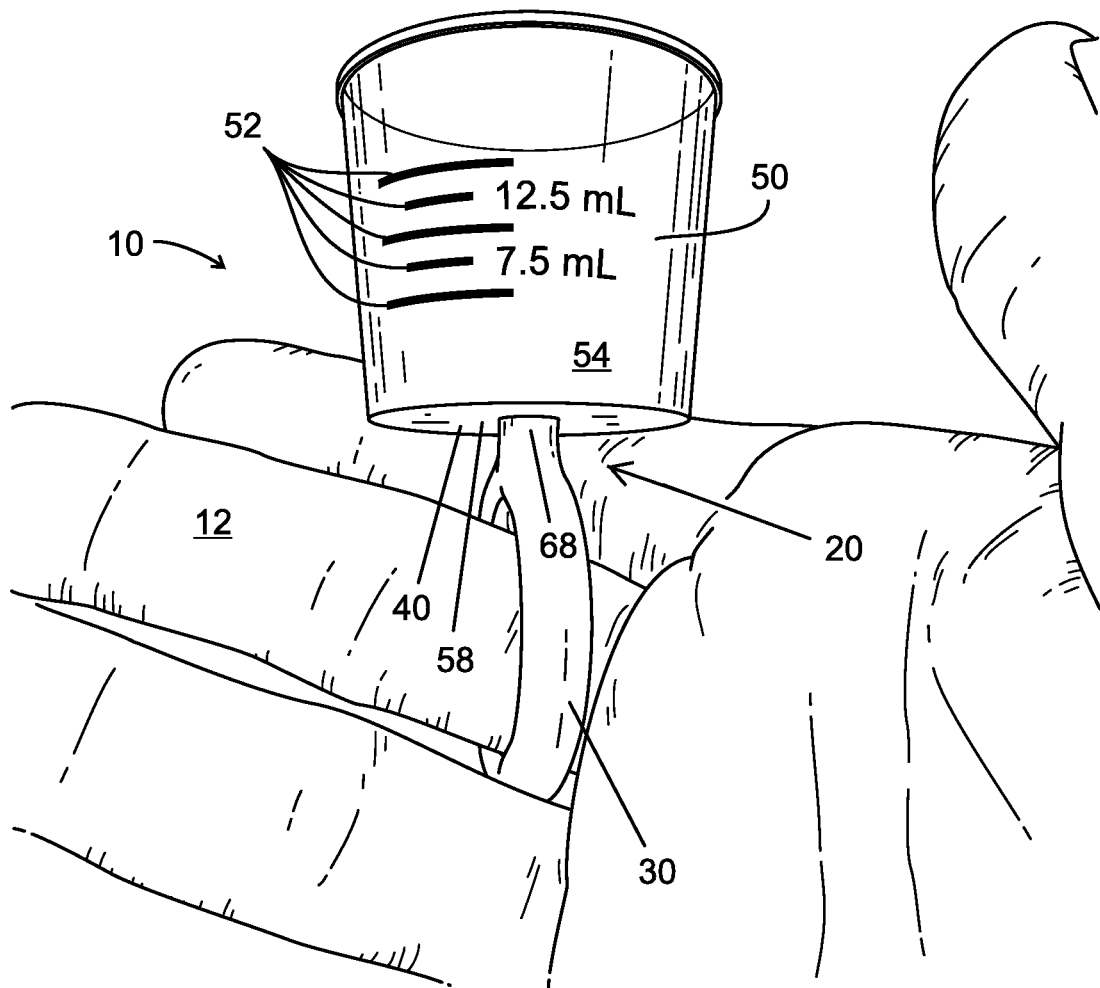
FIG. 1 is a perspective view of a preferred embodiment of the apparatus of the present invention.
Figure 2:
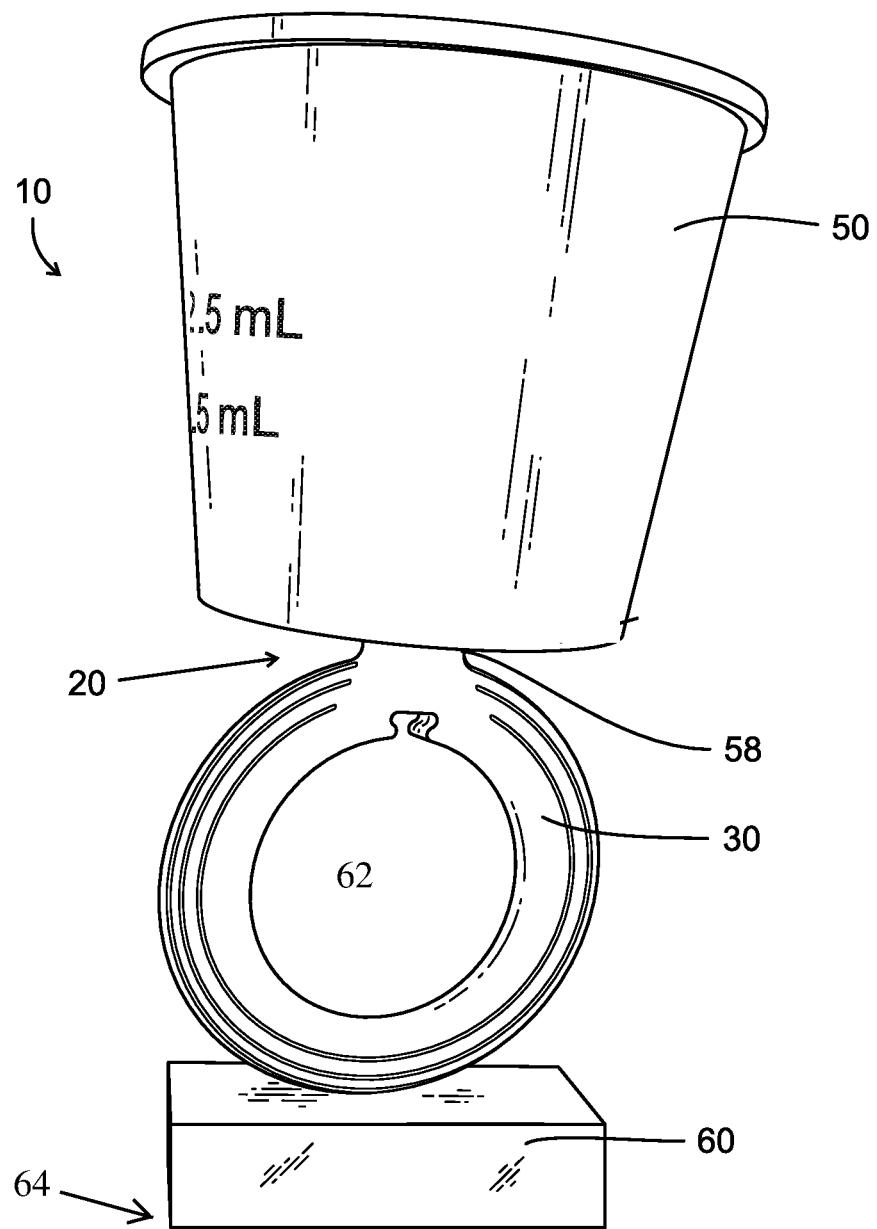
FIG. 2 is an alternative embodiment of the apparatus of the present invention.
Figure 7:
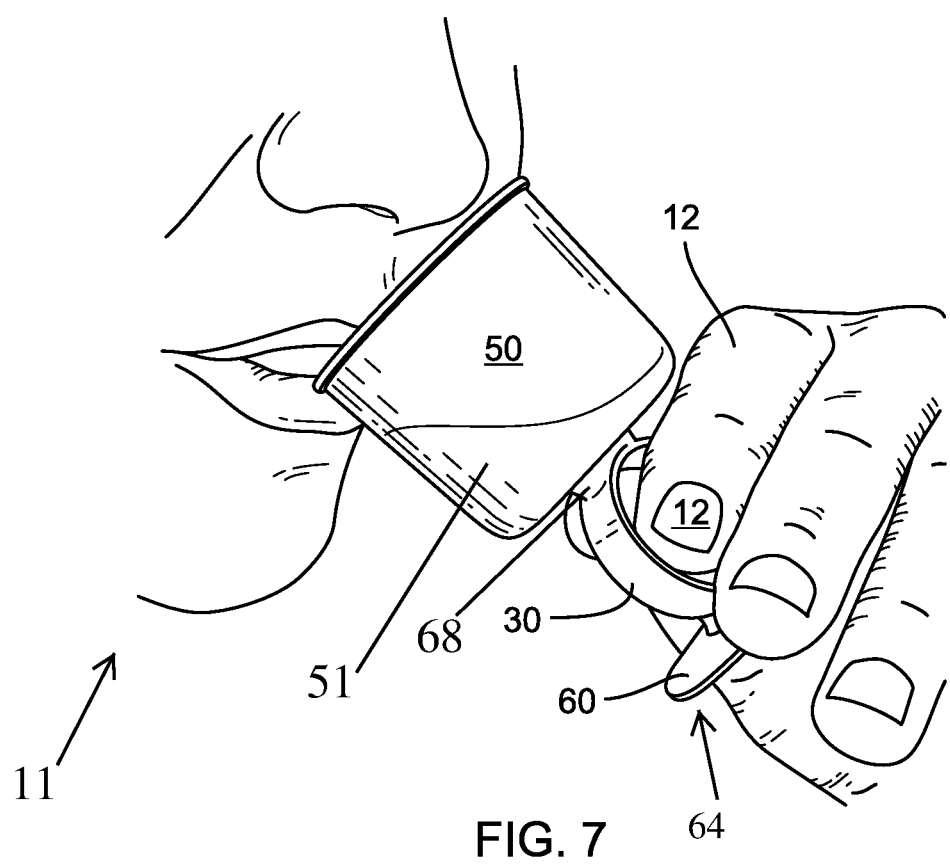
FIG. 7 is a perspective view of a preferred embodiment of the apparatus of the present invention.

FIGS. 1, 2 and 7-9 show a preferred embodiment of the apparatus of the present invention, designated generally by the numeral 10. FIGS. 1, 2 and 7 show medicine cup apparatus 10. In FIG. 1, cup apparatus 10 is supported at ring or ring attachment 20 to the finger 12 of a user 11. The ring attachment 20 can include ring 30 and base 40. Cup 50 has indicia or measurements 52 that are spaced apart, thus calibrating cup 50 side wall 54 into selected volumes. In FIGS. 1 and 2, indicia 52 can correspond to volumes of 5 ml, 7.5 ml, 10 ml, 12.5 ml, and 15 ml as examples. Cup 50 has bottom panel 56. In FIGS. 1-2, ring 30 attaches to cup 50 bottom panel 56 with base 40 having circular disk 58.

In a preferred embodiment of the present invention, ring attachment 20 attaches to the bottom 56 of medicine cup 50. Gradations 52 marked on side wall 54 enable a user 11 to measure the dose of medicine to be taken. Ring 30 easily fits around a user's finger 12 for ease of holding the cup 50 and administering medications. Ring 30 has opening 62 that can be sized and shaped to accommodate a user's finger 12.

In various preferred embodiments of the present invention, ring attachment 20 can be removably attached to medicine cup 50, preferably removably attached to the bottom panel 56 of medicine cup 50. Alternatively, ring attachment 20 can be an integrated, molded unit with medicine cup 50 at bottom panel 56.

FIG. 1 shows a preferred embodiment of the present invention, specifically, medicine cup apparatus 10 including medicine cup 50 attached to ring attachment 20 that includes ring 30 and base 40. Ring 30 can easily fit onto a user's finger 12. Base 40 can be attached to ring 30, attached to the bottom 56 of medicine cup 50. In a preferred embodiment of the present invention, a user 11 can easily slide his or her finger 12 through ring 30 opening 62. In various preferred embodiments of the present invention, ring attachment 20 can be made of latex. Alternatively, in various preferred embodiments of the present invention, ring attachment 20 can be latex-free or made of any of the following: plastics, metals, glass, porcelain, paper, cloth, wood, stone, rubber, foam. In various preferred embodiments of the present invention, ring attachment 20 can be removably attached to medicine cup 50. In various alternative preferred embodiments of the present invention, ring attachment 20 can be permanently attached to medicine cup 50.

FIGS. 3-6 show an alternative embodiment of the apparatus of the present invention, with medicine cup apparatus 10 including ring attachment 20 attached to medicine cup 50. Ring 30 of ring attachment 20 rests on stand 60. FIG. 2 shows how ring 30 can stand up on its own when ring attachment 20 rests on stand 60. Stand 60 has a flat lower surface 64 for engaging a surface such as a table top, kitchen counter top or a similar flat surface 66.

Figure 8:
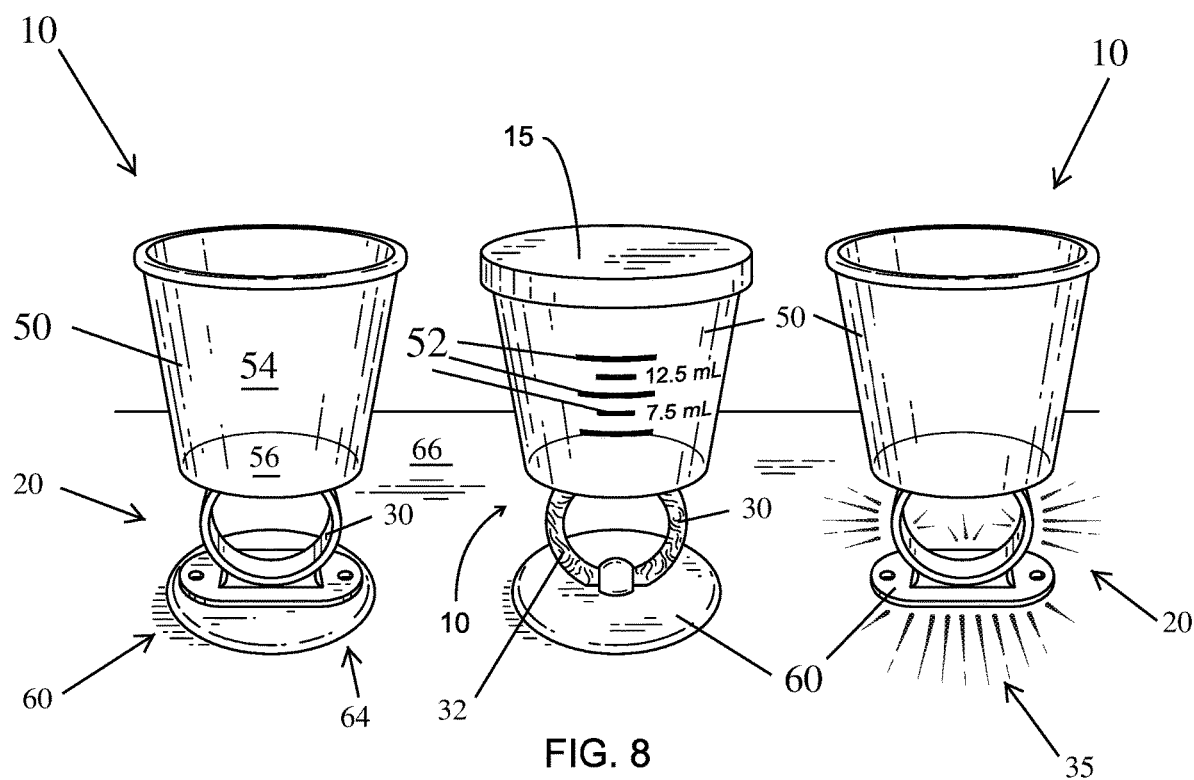
FIG. 8 shows various preferred embodiments of the present invention, including one embodiment having a closure lid on the medicine cup.
Figure 9:
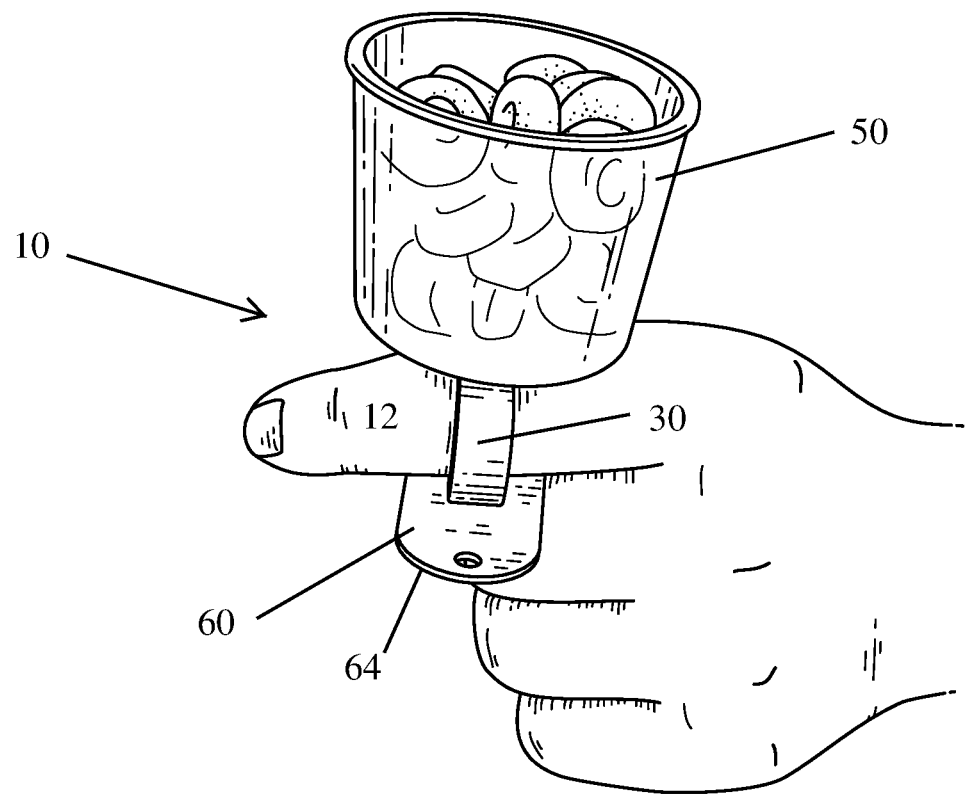
FIG. 9 is a perspective view of a preferred embodiment of the apparatus of the present invention.

FIG. 3 illustrates how ring attachment 20 can be attached to stand 60 and how stand 60 can stand up on its own upon a table top 66 even with ring attachment 20 and medicine cup 50 above it. FIGS. 4 and 5 show different ways a user can hold ring 30. FIGS. 7 and 9 show user 11 using medicine cup apparatus 10. FIG. 7 shows liquid or medicine 51 in cup 50 that user 11 is drinking. FIG. 8 shows various preferred embodiments of the present invention, including medicine cup apparatus 10 with lid 15. FIG. 8 also shows grooves/textured surface 32 of ring 30 that can further assist user 11 in gripping ring attachment 20. FIG. 8 additionally shows how ring attachment 20 can light up 35.

In any of the embodiments of FIGS. 1-9, ring 30 can attach to bottom 56 of cup 50 using circular disk 58. Link 68 can join ring 30 to disk 58.

PARTS LIST

The following is a list of parts and materials suitable for use in the present invention: Parts Number Description
10 medicine cup apparatus
11 user
12 finger of user 11
15 lid
20 ring attachment
30 ring of ring attachment 20
32 grooves/textured surface of ring 30
35 light emanating from attachment 20
40 base of ring attachment 20
50 medicine cup
51 liquid/medicine in cup 50
52 gradation/measurement/indicia
54 cup side wall
56 cup bottom/bottom panel
58 circular disk
60 stand
62 opening of ring 30
64 flat lower surface
66 table top/flat surface
68 link All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A medicine cup apparatus comprising:
   a) a cup having a cup sidewall, bottom panel, and an interior for holding medicine to be administered;
   b) an attachment having a first end, a second end, and an opening, with said first end located distally from said second end, wherein said first end is connectable to the bottom panel of the cup, and wherein said opening is sized and shaped to accommodate a user's finger, and wherein said second end has a lower surface that enables the cup to rest in an upright position on an underlying support surface; and
   c) wherein the attachment is textured to allow for a better grip of said attachment.

2. The medicine cup apparatus of claim 1, wherein said first end of said attachment is removably connected to the bottom panel of the cup.

3. The medicine cup apparatus of claim 1, wherein said cup has volume measurement marks of between about 0 and 15 milliliters.

4. The medicine cup apparatus of claim 1, further comprising a cover for the medicine cup; and wherein said first end of said attachment is removably connected to the bottom panel of the cup.

5. The medicine cup apparatus of claim 1, wherein the attachment is designed to be collapsible.

6. The medicine cup apparatus of claim 1, wherein said opening is located between said first end and said second end of said attachment.

7. The medicine cup apparatus of claim 1, wherein a part of the attachment lights up.

8. The medicine cup apparatus of claim 1, wherein the attachment facilitates oral administration of a selected medicine in said cup interior when a user places his or her finger in the opening.

9. The medicine cup apparatus of claim 1, further comprising a means to operably sync to a mobile device.

10. The medicine cup apparatus of claim 9, wherein the attachment is designed to be collapsible.

11. A medicine cup apparatus comprising:
   a) a cup having a cup sidewall, bottom panel, and an interior for holding food;
   b) a ring attachment comprising a ring with a ring opening that is sized and shaped to accommodate a user's finger;
   c) a base that includes a disk, wherein one side of the disk is attached to the ring and the other side of the disk is connectable to the bottom panel of the cup;
   d) a stand connected to the ring opposite the cup bottom panel that has a lower surface that enables the cup to rest in an upright position on an underlying support surface;
   e) wherein the ring attachment is grooved or textured to allow for a better grip of said ring; and f) wherein the ring facilitates feeding of a selected food in said cup interior.

12. The medicine cup apparatus of claim 11, wherein the ring attachment is collapsible.

13. The medicine cup apparatus of claim 11, further comprising a cover for the medicine cup.

14. The medicine cup apparatus of claim 13, wherein the ring attachment is removably connected to the bottom of the medicine cup.

15. The medicine cup apparatus of claim 11, wherein the ring attachment is removably connected to the bottom of the medicine cup.

16. A medicine cup apparatus comprising:
   a) a medicine cup with gradations for measuring and dispensing fluid medicine;
   b) said cup having a volume of between about 0 and 15 milliliters, a cup side wall, a cup bottom panel and a cup interior;
   c) a ring attached to the cup bottom panel, the ring being sized and shaped to accommodate a user's finger, wherein the ring facilitates oral administration of a selected medicine contained in said cup interior;
   d) wherein the ring is textured to allow for a better grip of said ring; and
   e) a means to operably sync to a mobile device.

17. The medicine cup apparatus of claim 16, further comprising a stand that the ring can rest on and remain in an upright standing position.

18. The medicine cup apparatus of claim 17, further comprising a cover for the medicine cup.

19. The medicine cup apparatus of claim 16, further comprising a cover for the medicine cup.

20. The medicine cup apparatus of claim 16, wherein the ring is removably connected to the cup bottom panel.

* * * * *